(No Model.)
H. L. MANN.
ADJUSTABLE MANDREL FOR WOBBLING SAWS.
No. 474,844. Patented May 17, 1892.
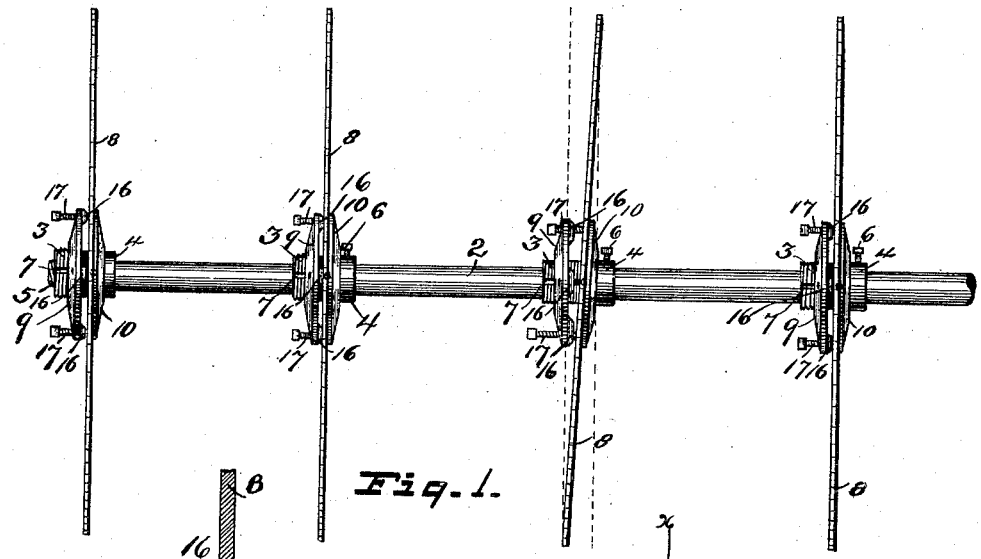
Fig. 1.
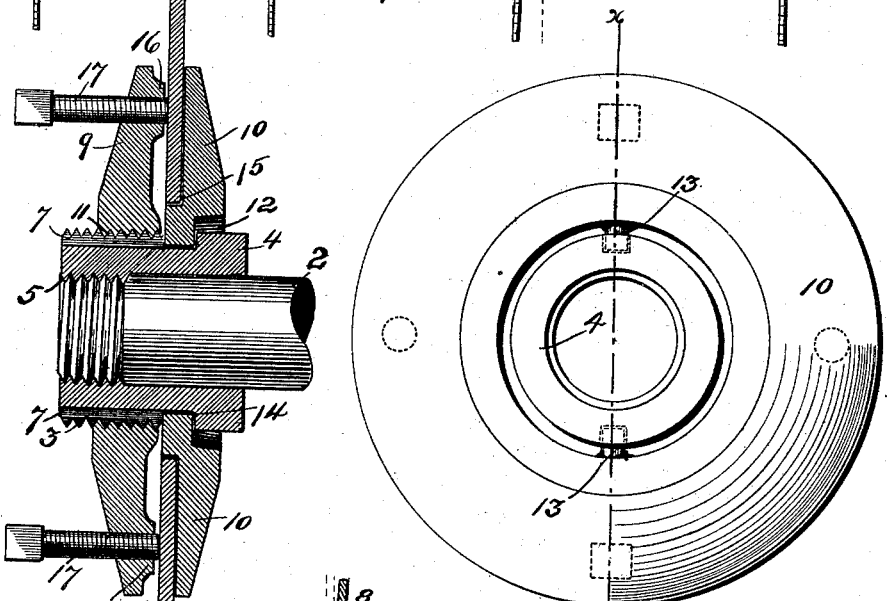
Fig. 4.
Fig. 3.
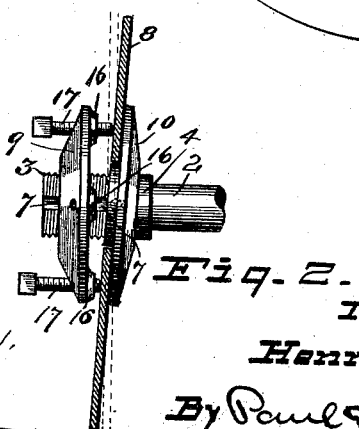
Fig. 2.
Witnesses.
C. E. Van Dorn.
O. G. Hawley
Inventor
Henry L. Mann
By Paul H. Merwin Att'ys.

UNITED STATES PATENT OFFICE.

HENRY L. MANN, OF MINNEAPOLIS, MINNESOTA.

ADJUSTABLE MANDREL FOR WABBLING SAWS.

SPECIFICATION forming part of Letters Patent No. 474,844, dated May 17, 1892.

Application filed May 29, 1891. Serial No. 394,516. (No model.)

*To all whom it may concern:*

Be it known that I, HENRY L. MANN, of Minneapolis, in the county of Hennepin and State of Minnesota, have invented certain Improvements in Adjustable Mandrels for Wabbling Saws, of which the following is a specification.

My invention relates to means for securing a saw upon an arbor in such a way that the same will wabble and hence cut a groove considerably wider than the thickness of the saw itself.

The object of the invention is to provide a mandrel or dado head readily attachable to any saw-arbor, and which will be of a very simple and cheap construction, and by the use of which the saw is given a greater latitude of movement.

To these ends my invention consists in a threaded and longitudinally-grooved sleeve arranged on the saw-arbor, in combination with a wabbling disk or collar having a central opening of greater diameter than said sleeve, said disk being provided with lugs extending into the slots in said sleeve, an annular shoulder on the inside of said collar, adapted to engage the saw, and a second collar having an internal thread engaging the threaded end of the sleeve, and set screws and bolts arranged in said second collar and adapted to be screwed against the saw held on the wabbling disk or collar. By adjustment of the set-screws and the collar containing the same the tilt of the saw may be varied as desired.

My invention consists, further, in various details of construction and in combinations hereinafter described, and particularly pointed out in the claims.

My invention will be more readily understood by reference to the accompanying drawings, in which—

Figure 1 is a view showing four saws arranged on a single arbor. Fig. 2 is an enlarged view showing one of my devices upon the end of a saw-arbor, the saw being shown in section. Fig. 3 is an end view of the mandrel device, the arbor or shaft being removed. Fig. 4 is a vertical section on the line x x of Fig. 3 and showing the saw-arbor in position.

As shown in the drawings, my devices may be secured to the shaft or arbor 2 by the threaded sleeve 3, having the unthreaded end 4 either secured on the arbor by internal threads 5 or by set-screws or keys 6; but it is obvious that if a new machine were to be fitted up with my mandrels the sleeve parts could be made directly on the shafts. The threaded portion of each sleeve is much longer than the unthreaded portion and is provided with slots or grooves 7, occupying diametrically-opposite positions. The circular saw 8 is held upon the arbor by the two disks 9 and 10, the first being stationary on the sleeve and secured thereto by threads 11, engaging the threads of the sleeve and holding the collar at all times perpendicular with the shaft. The other collar 10 is provided with the central opening 12, considerably larger in diameter than the end of the sleeve. Two lugs or trunnions extend from the inner walls of the openings 12 and into the slots 7 in the sleeve. These lugs engage the end shoulders or walls 14 of the slots 7, the collar being thereby held against longitudinal movement on the sleeve, while at the same time it is allowed to tilt or wabble thereon. The annular shoulder 15 is provided on the inside of the collar 10 and adapted to hold the saw 8 concentric with the arbor. I provide shoulders or raised parts 16 on the inner face of the disk 9 to give the set-screws 17 a longer threaded bearing in the collar. Four screw-holes are usually arranged in the disk 9, so that the positions of the set-screw may be varied. Four of the shoulders 16 are provided, so that a solid and strong bearing may be had against the saw when it is desired to hold the same for a straight cut, at which time the set-screws are turned out so that their ends do not project through the disk 9. The disk is then turned tightly against the saw to force the tilting disk 10 into a perpendicular position. When, however, it is desired to use the saw for cutting grooves or dados, the disk 9 is turned back on the sleeve so as to be a considerable distance from the other disk and the set-screws 17 are forced against the saw to lock the same in just the required position.

It is obvious that a saw of any thickness may be used upon the mandrel, one of the thinnest being shown in the drawings.

In practice I provide a number of saws filed in such ways as to render the same capable of cutting in the best possible manner the various widths of grooves, and it will be seen that one saw may be substituted for another by simply unscrewing the disk 9 from the sleeve.

Having thus described my invention, I claim as new and desire to secure by Letters Patent—

1. The combination, in a wabbling-saw mandrel, of a threaded part arranged on the arbor and provided with slots or grooves 7 with a disk 9, fixed on said threaded part, and a wabbling disk 10, having lugs projecting into said grooves, and set-screws arranged in the fixed disk 9 and adapted to engage a saw held upon the disk 10, substantially as described.

2. The combination, in a wabbling-saw mandrel, of the sleeve having the threaded and unthreaded portions and provided with diametrically-opposite slots 7 with a disk 10, having a central opening 12 of a greater diameter than the end of said sleeve, lugs 13, projecting from said disk 10 into said groove, an annular shoulder 15, provided on said disk 10, and a disk 9, provided with set-screws 17, substantially as and for the purpose specified.

3. The combination, in a wabbling-saw mandrel, of the sleeve 3, having the slots or grooves 7 and the unthreaded portion 4, with means for securing the same on the saw-arbor, a wabbling disk 10, having lugs extending into said grooves, and means for securing the circular saw thereon, the disk 9, threaded to engage the sleeve 3 and held perpendicular to the saw-arbor, shoulders 16 on the inner surface of the disk 9, and set-screws 17, extending through the same and adapted to engage the saw, substantially as described.

In testimony whereof I have hereunto set my hand this 25th day of May, 1891.

HENRY L. MANN.

In presence of—
O. G. HAWLEY,
FRED S. LYON.